United States Patent
Sishtla

(10) Patent No.: US 9,732,997 B2
(45) Date of Patent: Aug. 15, 2017

(54) LOW LEAKAGE SEAL FOR LOW PRESSURE SYSTEM

(71) Applicant: Carrier Corporation, Farmington, CT (US)

(72) Inventor: Vishnu M. Sishtla, Manlius, NY (US)

(73) Assignee: CARRIER CORPORATION, Farmington, CT (US)

( * ) Notice: Subject to any disclaimer, the term of this patent is extended or adjusted under 35 U.S.C. 154(b) by 0 days.

(21) Appl. No.: 14/787,825

(22) PCT Filed: Apr. 21, 2014

(86) PCT No.: PCT/US2014/034750
§ 371 (c)(1),
(2) Date: Oct. 29, 2015

(87) PCT Pub. No.: WO2014/179089
PCT Pub. Date: Nov. 6, 2014

(65) Prior Publication Data
US 2016/0076800 A1  Mar. 17, 2016

Related U.S. Application Data

(60) Provisional application No. 61/816,962, filed on Apr. 29, 2013.

(51) Int. Cl.
*F16L 17/00* (2006.01)
*F25B 41/00* (2006.01)
(Continued)

(52) U.S. Cl.
CPC ........... *F25B 41/003* (2013.01); *F16J 15/002* (2013.01); *F16J 15/40* (2013.01); *F16L 17/10* (2013.01);
(Continued)

(58) Field of Classification Search
USPC ............ 285/368, 336, 99, 96.106, 351, 352
See application file for complete search history.

(56) References Cited

U.S. PATENT DOCUMENTS 1,076,932 A    10/1913  Zeh
1,666,495 A *   4/1928  Hodgkinson ........... F01D 13/02
                                                        285/10
(Continued)

FOREIGN PATENT DOCUMENTS

CH              373934      12/1963
CN           102022596 A     4/2011
(Continued)

OTHER PUBLICATIONS

Notification of Transmittal of the International Search Report for International Application No. PCT/US2014/034750 datedJun. 26, 2014; Mailed Jul. 4, 2014; 5 pages.
(Continued)

*Primary Examiner* — Aaron Dunwoody
(74) *Attorney, Agent, or Firm* — Cantor Colburn LLP

(57) ABSTRACT

A seal configured for use in a chiller refrigeration system is provided including a first flange and a second flange. The first flange and the second flange are coaxially aligned and in direct contact. The second flange includes at least one groove within which a first sealing mechanism and a second sealing mechanism are positioned. The first sealing mechanism and the second sealing mechanism are separated by a distance such that a chamber configured to receive a pressurized gas is formed between the first and second sealing mechanisms.

15 Claims, 4 Drawing Sheets

(51) Int. Cl.
*F16J 15/00* (2006.01)
*F16J 15/40* (2006.01)
*F16L 17/10* (2006.01)
*F16L 23/22* (2006.01)
*F16L 23/18* (2006.01)

(52) U.S. Cl.
CPC ............... *F16L 23/18* (2013.01); *F16L 23/22* (2013.01); *F25B 2339/047* (2013.01); *F25B 2500/22* (2013.01); *F28F 2230/00* (2013.01); *F28F 2265/16* (2013.01)

(56) References Cited

U.S. PATENT DOCUMENTS

| | | | |
|---|---|---|---|
| 2,760,673 A | 4/1955 | Laurent | |
| 3,048,413 A | 10/1959 | Wood | |
| 3,040,975 A * | 6/1962 | Langdon | F04C 25/00 285/10 |
| 3,144,035 A * | 8/1964 | Hablanian | B01J 3/006 137/1 |
| 3,485,516 A * | 12/1969 | Hans | F16L 23/12 285/123.1 |
| 3,599,991 A | 8/1971 | Combes et al. | |
| 3,600,010 A | 8/1971 | Downs, III et al. | |
| 3,627,260 A | 12/1971 | Grove | |
| 3,947,044 A | 3/1976 | Friedrich | |
| 4,441,725 A * | 4/1984 | Bailey | F16L 23/08 277/614 |
| 4,569,540 A * | 2/1986 | Beson | E21B 33/04 285/123.13 |
| 4,796,896 A | 1/1989 | Anderson, Jr. | |
| 4,848,806 A * | 7/1989 | Miller | B64G 1/22 244/131 |
| 5,090,871 A * | 2/1992 | Story | F16L 23/167 210/85 |
| 5,117,876 A | 6/1992 | Kuntz | |
| 5,133,577 A | 7/1992 | Schultze et al. | |
| 5,182,076 A * | 1/1993 | de Seroux | F16L 23/167 376/203 |
| 5,197,766 A * | 3/1993 | Glover | F16L 23/167 210/165 |
| 5,354,101 A | 10/1994 | Anderson, Jr. | |
| 5,368,648 A * | 11/1994 | Sekizuka | C23C 16/4401 118/733 |
| 5,607,165 A | 3/1997 | Bredemeyer | |
| 6,223,587 B1 * | 5/2001 | Chiocca | G21F 5/12 250/506.1 |
| 6,234,540 B1 * | 5/2001 | Drijver | B63B 22/023 277/558 |
| 6,299,216 B1 * | 10/2001 | Thompson | F16L 23/167 277/318 |
| 6,581,976 B1 * | 6/2003 | Pollack | F16L 27/087 285/106 |
| 7,648,177 B2 | 1/2010 | Tombler, Jr. et al. | |
| 7,942,452 B2 | 5/2011 | Carns et al. | |
| 8,261,596 B2 * | 9/2012 | Harrison | F16J 15/06 73/46 |
| 8,393,649 B2 * | 3/2013 | Kitaguchi | F16L 23/167 285/12 |
| 2005/0046180 A1 * | 3/2005 | Tombler, Jr. | F16J 15/164 285/95 |
| 2010/0181324 A1 | 7/2010 | Morinaga et al. | |

FOREIGN PATENT DOCUMENTS

| | | |
|---|---|---|
| CN | 102466075 A | 5/2012 |
| EP | 1050699 A2 | 11/2000 |
| GB | 958345 A | 5/1964 |
| WO | 2012044172 A2 | 4/2012 |
| WO | 2012130935 A1 | 10/2012 |
| WO | 2013152419 A1 | 10/2013 |
| WO | WO 2013152419 A1 | 10/2013 |

OTHER PUBLICATIONS

Written Opinion of the International Searching Authority for International Application No. PCT/US2014/034750 dated Jun. 26, 2014; Mailed Jul. 4, 2014; 6 pages.
Chinese Office Action and Search Report with Translations for Chinese Appln. No. 201480037320.2; dated Jan. 3, 2017; 15 pages.

* cited by examiner

LOW LEAKAGE SEAL FOR LOW PRESSURE SYSTEM

BACKGROUND OF THE INVENTION

The invention relates generally to chiller refrigeration systems and, more particularly, to a seal that prevents ambient air from entering an interface of a chiller refrigeration system.

Water cooled centrifugal chillers commonly use low and medium pressure refrigerants; however, low pressure refrigerants have a higher cycle efficiency than medium pressure refrigerants. Because the saturation pressure is lower than the ambient pressure during normal operation, air will leak into the cooler and ultimately travel to the condenser. Air is non-condensable, so the air stays in the condenses and raises the pressure above the saturation vapor pressure, thus causing the compressor to work harder, thereby offsetting the benefit associated with using a low pressure refrigerant. Low pressure chillers typically include a purge system used periodically to remove non-condensables which adds both complexity and cost to the chiller.

BRIEF DESCRIPTION OF THE INVENTION

According to an aspect of the invention, a seal configured for use in a chiller refrigeration system is provided including a first flange and a second flange. The first flange and the second flange are coaxially aligned and in direct contact. The second flange includes at least one groove within which a first sealing mechanism and a second sealing mechanism are positioned. The first sealing mechanism and the second sealing mechanism are separated by a distance such that a chamber configured to receive a pressurized gas is formed between the first and second sealing mechanisms.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
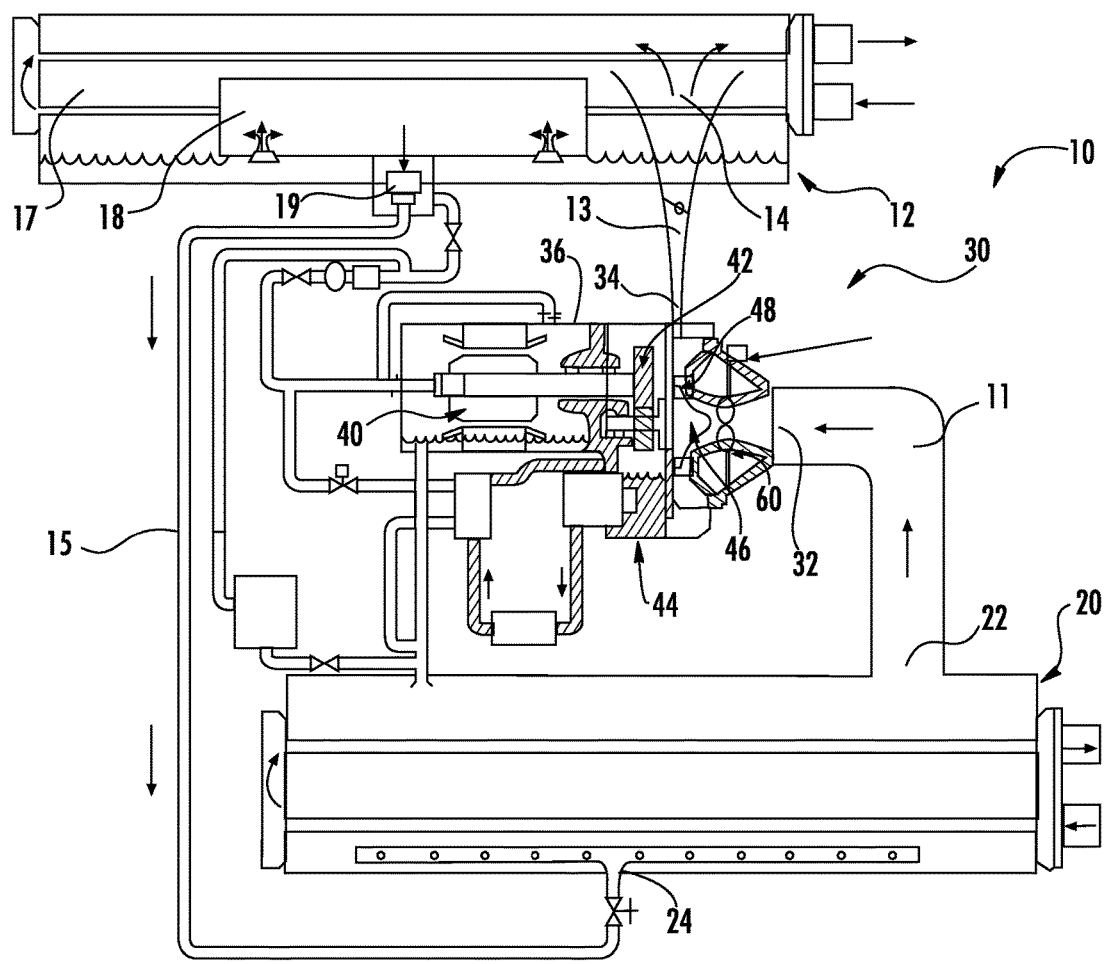
FIG. 1 is a schematic illustration of an exemplary chiller refrigeration system.
Figure 2:
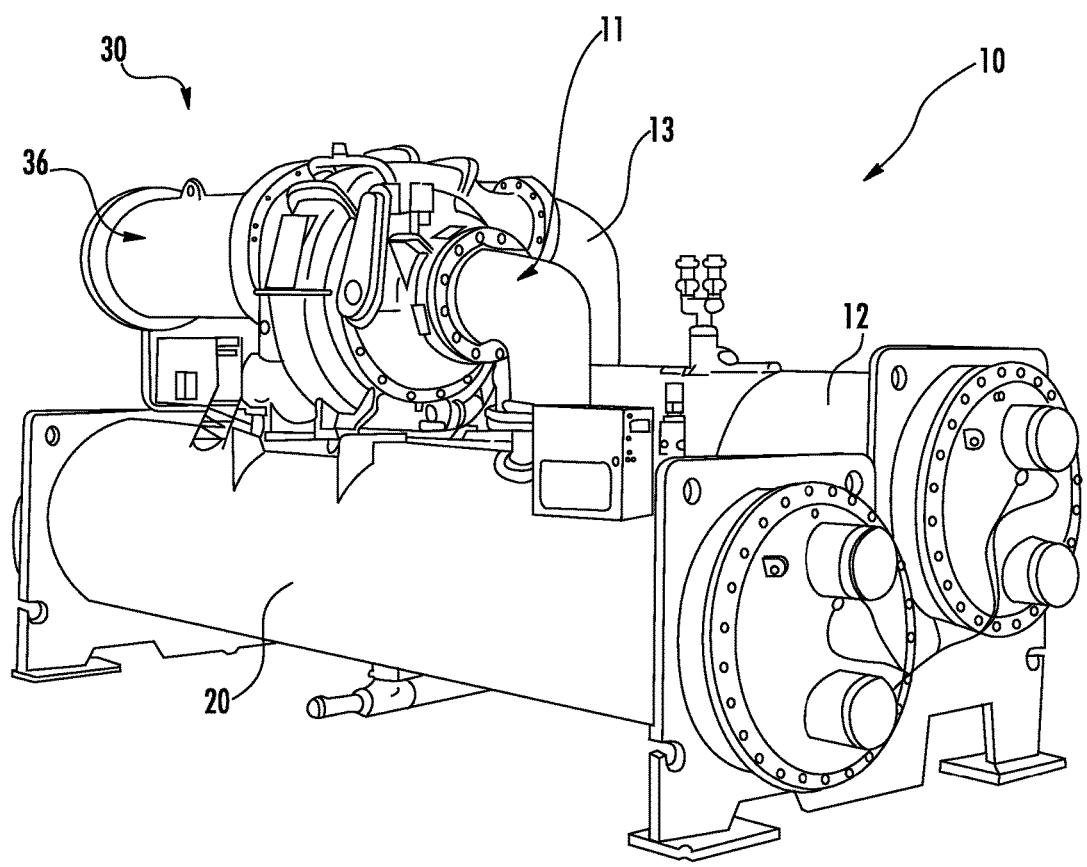
FIG. 2 is a perspective view of an exemplary chiller refrigeration system.

Referring now to FIGS. 1 and 2, the illustrated exemplary chiller refrigeration system 10 includes a compressor assembly 30, a condenser 12, and a cooler or evaporator 20 fluidly coupled to form a circuit. A first conduit 11 extends from adjacent the outlet 22 of the cooler 20 to the inlet 32 of the compressor assembly 30. The outlet 34 of the compressor assembly 30 is coupled by a conduit 13 to an inlet 14 of the condenser 12. In one embodiment, the condenser 12 includes a first chamber 17, and a second chamber 18 accessible only from the interior of the first chamber 17. A float valve 19 within the second chamber 18 is connected to an inlet 24 of the cooler 20 by another conduit 15. Depending on the size of the chiller system 10, the compressor assembly 30 may include a rotary, screw, or reciprocating compressor for small systems, or a screw compressor or centrifugal compressor for larger systems. A typical compressor assembly 30 includes a housing 36 having a motor 40 at one end and a centrifugal compressor 44 at a second, opposite end, with the two being connected by a transmission assembly 42. The compressor 44 includes an impeller 46 for accelerating the refrigerant vapor to a high velocity, a diffuser 48 for decelerating the refrigerant to a low velocity while converting kinetic energy to pressure energy, and a discharge plenum (not shown) in the form of a volute or collector to collect the discharge vapor for subsequent flow to a condenser. Positioned near the inlet 32 of the compressor 30 is an inlet guide vane assembly 60. Because a fluid flowing from the cooler 20 to the compressor 44 must first pass through the inlet guide vane assembly 60 before entering the impeller 46, the inlet guide vane assembly 60 may be used to control the fluid flow into the compressor 44.

The refrigeration cycle within the chiller refrigeration system 10 may be described as follows. The compressor 44 receives a refrigerant vapor from the evaporator/cooler 20 and compresses it to a higher temperature and pressure, with the relatively hot vapor then passing into the first chamber 17 of the condenser 12 where it is cooled and condensed to a liquid state by a heat exchange relationship with a cooling medium, such as water or air for example. Because the second chamber 18 has a lower pressure than the first chamber 17, a portion of the liquid refrigerant flashes to vapor, thereby cooling the remaining liquid. The refrigerant vapor within the second chamber 18 is re-condensed by the cool heat exchange medium. The refrigerant liquid then drains into the second chamber 18 located between the first chamber 17 and the cooler 20. The float valve 19 forms a seal to prevent vapor from the second chamber 18 from entering the cooler 20. As the liquid refrigerant passes through the float valve 19, the refrigerant is expanded to a low temperature two phase liquid/vapor state as it passed into the cooler 20. The cooler 20 is a heat exchanger which allows heat energy to migrate from a heat exchange medium, such as water for example, to the refrigerant gas. When the gas returns to the compressor 44, the refrigerant is at both the temperature and the pressure at which the refrigeration cycle began.

Figure 3:
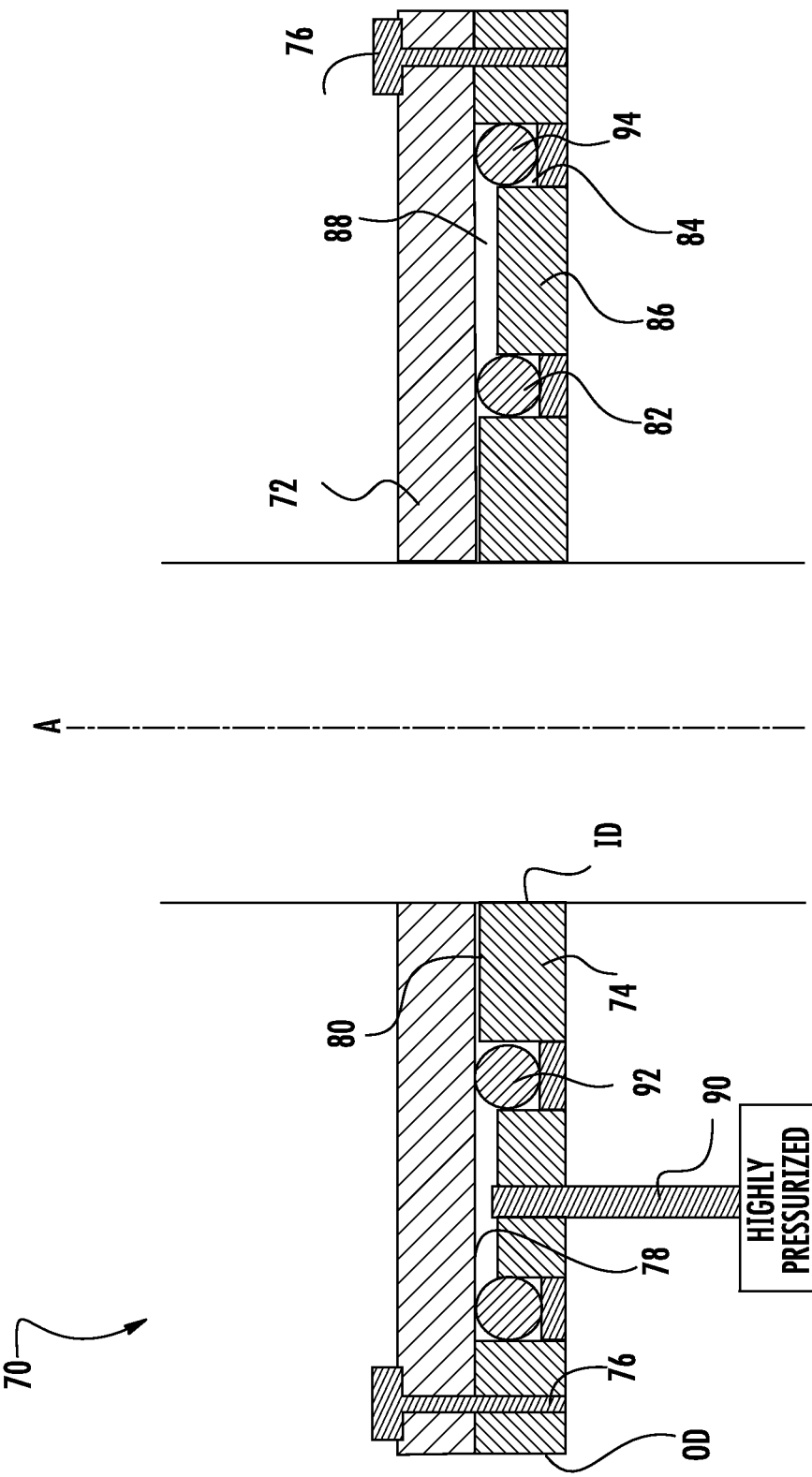
FIG. 3 is a cross-sectional view of a seal arranged at an interface between components of the chiller refrigeration system according to an embodiment of the invention.
Figure 4:
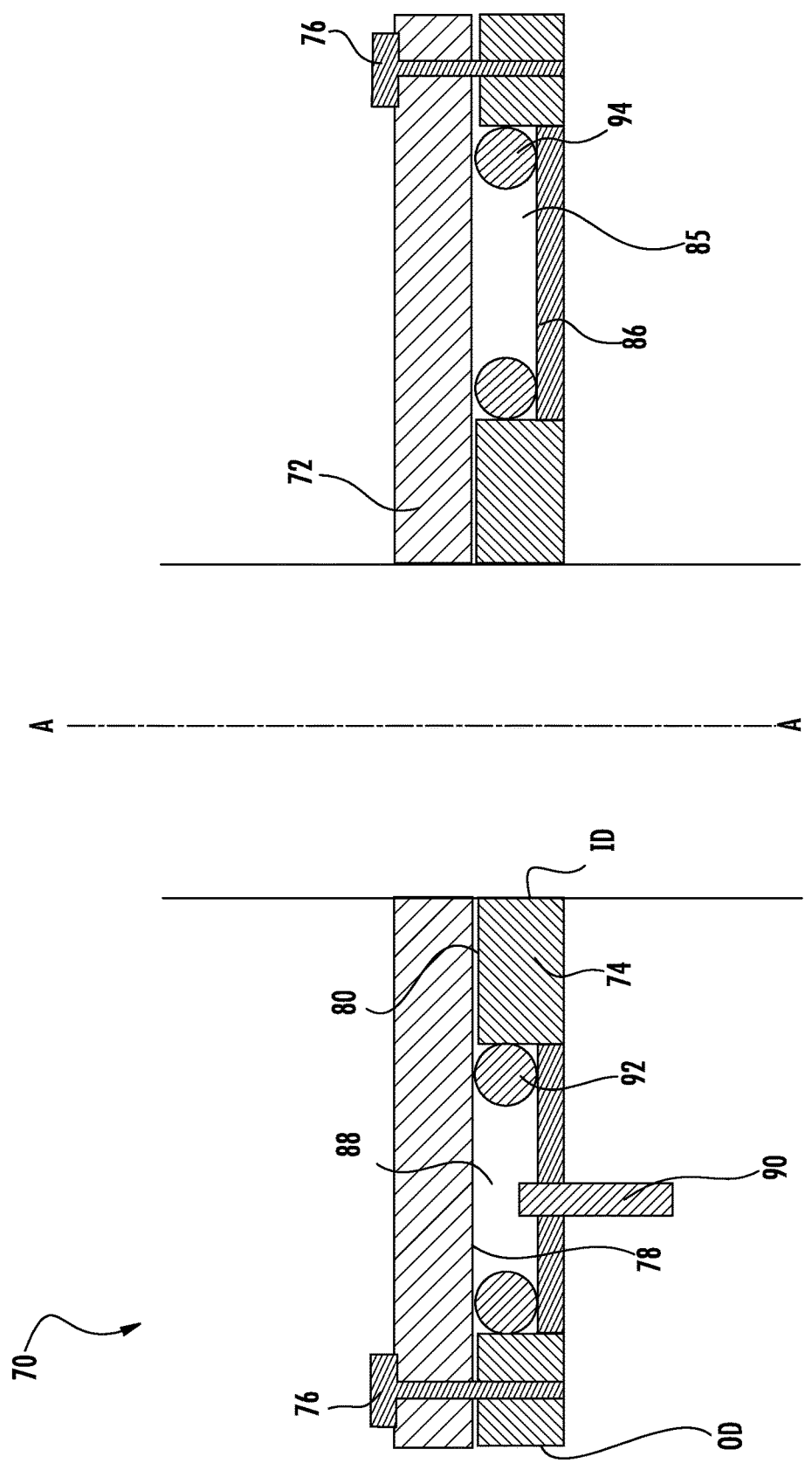
FIG. 4 is a cross-sectional view of a seal arranged at an interface between components of the chiller refrigeration system according to another embodiment of the invention.

As a result of the low pressure of the refrigerant within the chiller refrigeration system 10, outside air is prone to leak into the system 10 at any of a plurality of interfaces between coupled components of the system 10, such as between fluid conduits and components for example. Exemplary interfaces within the chiller refrigeration system 10 where the pressure of the refrigerant is lower than the ambient air, include, but are not limited to, between the fluid conduit 11 and the suction housing or inlet 32 of the compressor 30, and between the fluid conduit 15 and the inlet 24 of the cooler 20 for example. Referring now to FIGS. 3 and 4, a seal 70 is positioned at an interface between coupled components of the chiller refrigeration system 10 where the pressure of the refrigerant is less than the pressure of the ambient air. The seal 70 includes a first flange 72 integrally formed with a first component of the chiller refrigeration system 10 and a second flange 74 integrally formed with a second component of the chiller refrigeration system 10. The first flange 72 and the second flange 74 are substantially aligned about a central axis A and are positioned directly adjacent one another. The flanges 72, 74 are connected to one another, such as with a plurality of fasteners 76 arranged about the outer periphery of the flanges 72, 74 for example.

In the non-limiting embodiment illustrated in FIG. 3, a first groove 82 is formed in the surface 80 of the second flange 74 facing the first flange 72, generally near the inner diameter ID of the second flange 74. The depth of the first groove 82 extends over only a portion of the thickness of the second flange 74. A second groove 84 having a size and shape similar to the first groove 82 may be formed in the surface 80 of the second flange 74, near an outer diameter OD thereof. The thickness of a portion 86 of the second flange 74 extending between the first groove 72 and the second groove 84 may be reduced such that an internal chamber 88 is formed between the portion 86 of the second flange 74 and the adjacent surface 78 of the first flange 72.

A pipe or tube 90 extends through a hole (not shown) in portion 86 of the second flange 74 to the chamber 88 formed between portion 86 and the first flange 72. The tube 90 is configured to supply a highly pressurized gas, such as discharge gas from the condenser 12 of the chiller refrigeration system 10 for example, into the chamber 88. A first sealing mechanism 92 and a second sealing mechanism 94 are arranged within the first groove 82 and the second groove 84, respectively, and are configured to seal the chamber 88. The first sealing mechanism 92 is configured to prevent air from passing between the first and second flanges 72, 74 into the chiller refrigeration system 10. The second sealing mechanism 94 is configured to prevent the hot, high pressure gas from leaking to the low pressure side of the flanges 72, 74. In one embodiment, the sealing mechanisms 92, 94 are O-rings formed from a material suitable for use with a refrigerant.

In another embodiment, illustrated in FIG. 4, the first groove 82 and the second groove 84 are integrally formed as a single groove 85. In such embodiments, the first sealing mechanism 92 is arranged within the groove 85 near the inner diameter ID of the second flange 74 and the second sealing mechanism 94 is arranged within the groove 85 near the outer diameter OD of the second flange 74. The chamber 88 is the portion of the groove 85 arranged between the first and second sealing mechanisms 92, 94.

By supplying a pressurized gas into the substantially sealed chamber between flanges at an interface in the chiller refrigeration system 10, ambient air is blocked from leaking through the interface into the system 10. As a result, the efficiency of the chiller refrigeration is improved. Because the seal reduces the amount of non-condensable air within the system 10, the purge system used to periodically remove such non-condensables may be substantially reduced or eliminated. The reduction in size and/or capacity of the purge system will result in a cost savings and a simplified chiller refrigeration system 10 design.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention.

Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A chiller refrigeration system comprising:
   a first component having a first flange;
   a second component having a second flange, the second flange being coaxially aligned and directly in contact with the first flange, the second flange includes at least one groove; and
   a sealing assembly arranged within said at least one groove including a first sealing mechanism and a second sealing mechanism, the first sealing mechanism and the second sealing mechanism being separated by a distance such that a chamber is formed between the first sealing mechanism and the second sealing mechanism, wherein a highly pressurized gas is supplied to the chamber sealed by the first sealing mechanism and the second sealing mechanism, the highly pressurized gas being produced by operation of the chiller refrigeration system.

2. The chiller refrigeration system according to claim 1, wherein a pressure of the highly pressurized gas is greater than a pressure of ambient air adjacent the first flange and the second flange.

3. The chiller refrigeration system according to claim 1, wherein the first flange and the second flange are connected to one another with at least one fastener.

4. The chiller refrigeration system according to claim 1, further comprising a pipe extending through the second flange into the chamber, the pipe being configured to fluidly couple the chamber to a supply of highly pressurized gas.

5. The chiller refrigeration system according to claim 4, wherein the supply of highly pressurized gas is a discharge of a condenser of the chiller refrigeration system.

6. The chiller refrigeration system according to claim 1, wherein the first sealing mechanism is arranged near an inner diameter of the second flange and the second sealing mechanism is arranged near an outer diameter of the second flange.

7. The chiller refrigeration system according to claim 1, wherein the first sealing mechanism and the second sealing mechanism are o-rings.

8. The chiller refrigeration system according to claim 1, wherein the second flange includes a first groove and a second groove separated by a distance.

9. The chiller refrigeration system according to claim 8, wherein the first groove is arranged near an inner diameter of the second flange and the second groove is arranged near an outer diameter of the second flange.

10. The chiller refrigeration system according to claim 8, wherein the first sealing mechanism is arranged within the first groove and the second sealing mechanism is arranged within the second groove.

11. The chiller refrigeration system according to claim 10, wherein the first sealing mechanism and the second sealing mechanism are o-rings.

12. The chiller refrigeration system according to claim 8, wherein a portion of the second flange between the first groove and the second groove has a reduced thickness to form the chamber.

13. The chiller refrigeration system according to claim 1, wherein the first flange is integrally formed with the first component and the second flange is integrally formed with the second component, wherein at least one of the first component and the second component are part of the chiller refrigeration system.

14. The chiller refrigeration system according to claim 13, wherein the first component and the second component includes a fluid conduit and an inlet of a compressor of the chiller refrigeration system, respectively.

15. The chiller refrigeration system according to claim 13, wherein the first component and the second component includes a fluid conduit and an inlet of a cooler of the chiller refrigeration system, respectively.

\* \* \* \* \*